United States Patent [19]

Lindstrom et al.

[11] 4,374,151
[45] Feb. 15, 1983

[54] FROZEN DOUGH FOR BAKERY PRODUCTS

[75] Inventors: Ted R. Lindstrom, Tarrytown; Louise Slade, Bedford Hills, both of N.Y.

[73] Assignee: General Foods Corporation, White Plains, N.Y.

[21] Appl. No.: 209,911

[22] Filed: Nov. 24, 1980

[51] Int. Cl.$^3$ .............................................. A21D 13/00
[52] U.S. Cl. ........................................ 426/19; 426/62; 426/551
[58] Field of Search ........................ 426/18, 19, 60–62, 426/551, 24, 553

[56] References Cited

U.S. PATENT DOCUMENTS 3,208,855   9/1965   Enoch et al. ............................. 99/90
3,975,550   8/1976   Fioriti et al. ......................... 426/553

FOREIGN PATENT DOCUMENTS 51-061668   5/1976   Japan .
52-025046   2/1977   Japan .
535068     11/1976   U.S.S.R. .

OTHER PUBLICATIONS

British Patent 1,544,499 "Composition and Method for Retarding Staling of Baked Goods" Apr. 19, 1979.

*Primary Examiner*—Raymond N. Jones
*Assistant Examiner*—Elizabeth A. Hatcher
*Attorney, Agent, or Firm*—Thomas R. Savoie; Daniel J. Donovan

[57] ABSTRACT

A frozen, leavened dough suitable for immediate baking when taken from frozen storage is prepared from the usual dough ingredients and the addition of an exogenous quantity, or the generation of an endogenous quantity of a melting-point depressant such as ethanol. In order for the frozen dough to behave as an unfrozen dough having a good loaf volume and oven spring when baked, the dough must contain from about 5% up to about 20% of a melting-point depressant, with respect to the weight of water contained in the dough.

15 Claims, No Drawings

FROZEN DOUGH FOR BAKERY PRODUCTS

TECHNICAL FIELD

With the expansion of freezing-distribution mechanisms, the commercial marketing of frozen doughs for home baking or on-premise baking in supermarkets continues to grow in volume. The breadmaking process using frozen dough, however, has several serious problems to be solved. Among them are the length of time required for the preparation and thawing of the frozen product before baking, and the reduction in stability of the dough after freezing and thawing.

The objective of many researchers in the baking industry has been the retention of sufficient yeast viability and gassing power during frozen storage of doughs.

James W. Pence in Chapter 7 of *Quality And Stability Of Frozen Foods*, edited by W. B. VanArsdel et al, Wiley-Interscience, New York (1969) at pages 188–189 teaches that the yeast cells in unfermented frozen doughs are more cold-resistant than those in fermented doughs; therefore, most doughs are frozen with little or no fermention.

The American Institute of Baking, Bulletin No. 108 (1964), suggests that high-quality products of satisfactory storage life of frozen bread dough results when the level of yeast is increased to 4 or 5% flour basis, shortening or lard is at 5% flour basis and doughs are frozen immediately after molding with little or no fermentation.

Schremmer, in U.S. Pat. No. 3,375,117, teaches that a frozen dough, chemically-leavened or yeast-leavened, of prolonged storability is produced when flour and dough-forming ingredients are cooled and mixed at a temperature below about 0° C.

Matz et al, in U.S. Pat. No. 3,166,426, teaches that chemically-leavened doughs can be preserved by proofing at temperatures of about 60° to 75° F., cooling the dough for a time sufficient to bring the dough to its freezing point, and, thereafter, storing the dough at refrigeration temperatures above 32° F.

Ono et al, in U.S. Pat. No. 3,894,155, teaches the preparation of a frozen dough having improved storage stability wherein the fermentation activity of the yeast is suppressed by two-stage addition of yeast. The second-stage addition of yeast is done under cooled conditions (a temperature of 2° to 15° C.), immediately followed by mixing the dough thus formed and freezing it without further fermentation.

Taguchi et al, in U.S. Pat. No. 3,901,975, discusses the use of alpha-amino acids, either alone or in combination with a bromic acid salt, to prevent the reduction in yeast activity during the freezing and thawing of the dough.

The above references indicate that it is desirable to have a considerable proportion of yeast cells that have not been actively fermenting at the time of freezing in a yeast-leavened dough product. In a chemically-leavened dough system, Schremmer, *supra*, teaches that a gradual decomposition of the leavening agent takes place at the deep-freezing temperatures and thereby the taste of the baked goods after defrosting of the same is disadvantageously affected. Without exception, the known prior art teaches or suggests that to obtain a product of good quality the frozen dough, either chemically leavened or yeast leavened, should be defrosted or thawed before baking.

It would be desirable to produce leavened doughs which can be frozen and held for baking at some later time which will maintain quality during frozen storage, which can be conveniently prepared from the freezer to a finished baked loaf within about one hour and will have good load volume and oven spring.

DISCLOSURE OF THE INVENTION

This invention is directed to a frozen dough composition and a method of preparing said frozen dough which is suitable for immediate baking when removed from the freezer. One of the objects of this invention is to provide a frozen dough which behaves as an unfrozen dough that can be conveniently prepared from the freezer to a finished baked product within about one hour. Another object of this invention is to improve any dough composition so that when made according to the present method it is better capable of sustaining prolonged periods of freezing and is able to produce a good quality baked product. A feature of the invention is its ability to produce a raised, fresh, hot bread texture and flavor within about one hour from the time the dough is removed from frozen storage to the time in which baking is completed.

The intent of this invention is not to produce a frozen product that is soft from the freezer, in fact, the products of this invention are hard as they exit the freezer. The function of the melting point depressant in the frozen dough of this invention is to permit the dough to quickly soften in the oven as its temperature rises. Expansion of $CO_2$ which is trapped within the dough and volatilization of ethanol contained in the dough can have a positive impact with respect to oven spring only if the dough is soft when expansion/volatilization occurs and only before an outer crust is formed. Thus, the sooner the dough softens, the greater will be the oven spring.

The method of producing the frozen dough composition comprises the following steps: formulation, mixing, fermenting, forming, resting, packaging, freezing, storing in a freezer below 0° C. The frozen dough is subsequently removed from frozen storage and immediately baked without the traditional thawing or proofing.

The novel frozen dough composition of this invention includes a melting-point depressant, such as ethanol, in addition to the necessary dough ingredients such as flour, water and a leavening agent. Other ingredients used in making dough may include sugar, salt, shortening and nonfat dry milk. These ingredients, when processed by the method described herein, interact in an unexpected way, enabling the frozen dough to behave as an unfrozen dough. Preparation of frozen bread dough by this method eliminates the usual thawing and proofing step, which usually requires 2–12 hours for the thawing and 2–4 hours for the proofing, before the dough is placed in the oven for baking.

As employed herein, the term "fermentation" is meant to include all changes in the dough brought about by the action of yeast enzymes or chemical agents which function to aerate a dough and develop the gluten. Total fermentation time includes the time elapsed during fermentation of the dough in bulk, resting or benching, and proofing. For the sake of clarity, traditional baking terminology is defined below and employed when appropriate to identify the specific dough treatment steps and/or dough ingredients.

"Fermentation in bulk" occurs after the dough formulation is mixed and allowed to stand before it is divided into separate portions. "Resting" is used interchangeably with "benching" to denote periods of time allowed to give the gluten of the flour time to recover from any step such as dividing, molding, forming, etc., wherein the dough has been stretched or worked. Without these rest periods, the dough is usually sticky and difficult to handle.

"Proofing" is the final step before baking or freezing wherein time is allowed for the yeast or chemical leavening agents to produce more gas to give the correct volume and vesiculation to the molded or shaped dough portion.

A "leavening agent" is a compound or mixture of chemical compounds which produces carbon dioxide gas that functions to aerate baked products. Thus, in yeasted bread, yeast is a leavening agent; in certain types of cookies, ammonium bicarbonate is a leavening agent; and in cakes, baking powder is a leavening agent. Baking powder is a mixture of chemical compounds, including sodium bicarbonate, which dissolves in water and reacts with an acid material to produce carbon dioxide.

The dough composition prepared according to the present invention can comprise all of the usual dry ingredients, shortenings and leavening agents in amounts traditionally employed in the baking industry. A radical departure from usual dough ingredients involves the use of a hydration medium comprising water and a sufficient amount of a melting-point depressant to overcome the thaw lag when baking the dough from the frozen state.

A suitable hydration medium contains from about 5% to about 20%, with respect to the weight of water contained in the dough, of a water-soluble, melting-point depressant selected from the group consisting of $C_1$ to $C_3$ monohydric alcohols, $C_2$ to $C_3$ polyhydric alcohols or combinations thereof. Examples of these melting-point depressants are methanol, ethanol, propanol, ethylene glycol, propylene glycol, glycerol or mixtures thereof. Ethanol is preferred because it is a natural endogenous ingredient in bread dough, resulting from yeast fermentation of dough sugars. Ethanol, unlike some other melting point depressants such as methanol, is also a food-approved additive. In addition, ethanol has a boiling point (78° C.) such that is does not remain in the final baked product.

Another advantage that results from using ethanol is that the volatilization of ethanol during baking contributes to the oven spring of the baked product.

With regard to the source of the ethanol for this invention, of course, the ethanol must be food grade if it is incorporated in products for human ingestion. Ethanol may be synthetically produced from ethylene, by direct catalytic hydration or by other means known in the art. Ethanol may also be naturally produced in a liquid ferment of a mixture of water, sugar and yeast. Sometimes other minor ingredients such as yeast food, salt, skim milk and mold inhibitor may be added to the liquid ferment; however, the predominant reaction of the mixture is an alcoholic fermentation. Thus, an exogenous portion of the ethanol employed in this invention can be obtained from a natural, prefermentation broth which is allowed to ferment for the purpose of producing the desired amount of alcohol.

The typical prefermentation broth is prepared by incubating a slurry containing 1 part sucrose, 10 parts water and 2.6 parts active dry yeast by weight at 30° C. until the conversion of the sucrose to 5% aqueous ethanol has proceeded to completion. To decrease the required incubation time or to produce higher concentrations of ethanol requires the use of a fast-fermenting, ethanol tolerant strain of *Saccharomyces cerevisiae*, also known as gasohol yeast. The broth is suitable for use with the residue of the whole-yeast cells; or, if desired, the yeast cells can be removed from the broth before mixing with other dough ingredients.

It is also feasible to generate in the dough, before freezing, an endogenous quantity of ethanol comprising up to 20% by weight, based on the amount of water in the dough, when using a fast-fermenting, ethanol-tolerant yeast that is described above. The use of such a fast-fermenting, ethanol-tolerant yeast in the dough formulation permits the *in situ* generation of the ethanol required for this invention.

On a flour basis, the moisture content of the dough of this invention will range between 30 and 80% by weight and, more typically, between 60 and 80%. If the dough contains moisture greater than the amount specified above, it will become difficult to handle. If the moisture content is too low, the dough becomes so stiff and nonextensible that the proper oven spring and rise do not occur.

In the present invention, the ingredients are mixed under ambient conditions which are usually lower than normal fermentation temperatures of about 30° C. Optimally, the fermentation temperature is in a range between 20° C. and 30° C. so as to obtain a slow and controlled rate of fermentation. If temperatures above 30° C. are utilized, the dough structure may expand too much and weaken. Those skilled in the art will readily appreciate that fermentation occurs as a function of time and temperature. In the present dough formulation, total fermentation time, before freezing, is usually for from 1.0 to 2.0 hours. Fermentation of the dough of this invention occurs at separate intervals of time; first in bulk and subsequently with the dough in divided portions. The fermentation periods comprise one or more short intervals of at least five minutes duration with the dough in bulk or in divided portions and one longer interval of about 45 minutes duration; however, the total fermentation time does not exceed two hours. Fermentation times and temperatures are limited so that the dough is not sensitive to changes during frozen storage. It is also important to have the proper dough rheological characteristics to obtain a high quality bread. Because the chemical leavening agents, yeast, yeast by-products and flour enzymes are important factors in obtaining the proper rheology, fermentation time must be controlled. However, those skilled in the art will also appreciate that different types of strains of yeast and different chemical leavening agents will dictate different times and temperatures to be used in fermentation.

After fermentation in bulk has taken place, conventional steps are employed in forming the dough into bread loaf configurations. Those skilled in the art will recognize that these steps usually consist of dividing, rounding, benching, molding and panning of the bread dough.

At this point in the process, the formed dough is allowed to proof for a period of time to rise to a given height. The proofing period allows the dough to generate additional carbon dioxide so that when it goes into an oven it will spring up. This proofing period is essential because the loss of carbon dioxide which occurs during dividing and formation must be regenerated. During this period, the gluten relaxes and the dough piece conforms to the shape of the container. The overall objective of the final proofing period is to allow each formed dough to attain a specific volume of between 1.76 to 3.08 cc/g dough, preferably 1.98 to 2.86 cc/g dough, before freezing.

The volume of the fermented dough, before freezing, has a direct correlation to the volume of the finished baked loaf which has been taken directly from the freezer and placed in a cold oven which gradually heats up to the preferred baking temperature. The difference in size of the frozen dough to the maximum size attained in the oven is called "oven spring," which can be positive or negative. When the fermented dough prior to freezing has a specific volume of from 1.0 to 2.64 cc/g, a positive oven spring results. When the fermented dough is greater than 2.64 cc/g, a positive but decreasing oven spring results. When the specific volume before freezing exceeds 3.08 cc/g, negative oven spring results, i.e., the bread does not rise in the oven. Thus, after forming each portion of fermented dough and proofing to allow additional fermentation before freezing, the proofing time should be sufficient for each portion of dough to attain a specific volume of from about 1.76 to about 3.08 cc/g to obtain a desirable baked bread which rises in the oven.

If the fermentation period is very long in time, the dough probably expands too much and weakens the dough structure. Another problem with extended fermentation periods is that the surface of the dough will be subject to an evaporation or dessication phenomenon. Consequently, a thin surface layer would form on the dough body which has a lower water content than the body of dough underneath the surface layer. This surface layer forms a coherent skin covering the dough body which in turn produces textural and color abberations not desired in a final baked bread. One method to retain the desired moisture content and prevent dessication of the dough is to package the dough immediately after the final proofing period. Another method is to package the dough immediately before the final proofing period and allow such period to occur while the dough is in the package. If one proceeded by the latter method, more energy would be required to freeze the dough within the package.

The dough should be frozen such that the core temperature of it reaches −1.0° C. to −25.0° C. and, more preferably, −6.0° C. to −25.0° C. within 1 to 6 hours and, more preferably, between 1½ and 4 hours. When freezing the dough, a uniform cooling rate throughout the dough is desirable. The frozen dough is typically stored at a temperature within the range of −30.0° C. to −10.0° C.

During the baking process, the dough expands to give a normal loaf volume. The expansion can be twice its original volume. This physical occurrence provides a sense of baking from "scratch" rather than just rewarming a previously baked product. This sense of accomplishment is further enhanced by the fresh-baked aroma of leavened bread which is given off.

The present invention is further illustrated, but in no way limited by the following examples.

EXAMPLES 1-2: Chemically-Leavened Frozen Dough

Several batches of dough ingredients, in the amounts listed below, are independently and homogeneously mixed with the hydration media set forth in Table I below.

| Ingredient | % Flour Basis |
|---|---|
| Enriched Wheat Flour (bleached, bromated) | 100.00 |
| Sucrose | 12.31 |
| High Heat Nonfat Dry Milk | 3.74 |
| Salt (NaCl) | 2.49 |
| Gluconolactone | 9.50 |
| Sodium Bicarbonate (NaHCO$_3$) | 3.00 |
| Sodium Stearoyl-2-Lactylate | 0.62 |
| Shortening (Soybean Oil with Ethoxylated Monoglycerides and Mono and diglycerides) | 6.25 |

TABLE I
CONCENTRATION OF ETHANOL IN HYDRATION MEDIA

| Example No. | % Ethanol | % Water | Hydration Media % Flour Basis |
|---|---|---|---|
| A* | 0 | 100 | 53.84 |
| 1 | 10 | 90 | 53.84 |
| 2 | 20 | 80 | 48.94 |

*Control; not an example of this invention.

Mixing of all dough ingredients is accomplished in a usual manner. Fermentation lasted approximately 90 minutes at about 25° C. Thereafter, the dough is formed into 100-gram portions and is allowed to rest for 10 minutes. After panning and proofing, the dough is packaged and frozen by a normal air-blast method. The frozen, packaged dough is stored at −15° C.

The frozen dough is taken from the freezer and immediately placed in a cold oven (a standard size Kenmore electric wall oven) which is immediately turned on and allowed to heat to a temperature of about 175° C. Each loaf is baked for about 45 minutes. The results obtained for each 100-gram baked loaf are as follows:

| Loaf for Example No. | A | 1 | 2 |
|---|---|---|---|
| Volume of Frozen Dough (cc) | 190 | 190 | 190 |
| Volume of Baked Loaf (cc) | 240 | 280 | 270 |
| Oven Spring (cc) | 50 | 90 | 80 |

The textural and taste characteristics of the bread in Examples 1 and 2 are comparable to bread made in the traditional manner at home. The effect of ethanol in the hydration medium is demonstrated by an almost two-fold increase in oven spring when compared to A, which does not contain ethanol.

EXAMPLE 3: YEAST-LEAVENED FROZEN DOUGH

Several batches of dough ingredients, in the amounts listed below, are independently and homogeneously mixed with the hydration media set forth in Table II below.

| Ingredient | % Flour Basis |
|---|---|
| Enriched Wheat Flour (bleached, bromated) | 100.00 |
| Sucrose | 12.31 |
| High Heat Nonfat Dry Milk | 3.74 |
| Salt (NaCl) | 2.49 |
| Yeast Food | 0.62 |
| Activated Dry Yeast | 4.98 |
| Sodium Stearoyl-2-Lactylate | 0.62 |
| Shortening (Soybean Oil with Ethoxylated Monoglycerides and Mono and Diglycerides) | 6.25 |

TABLE II

CONCENTRATION OF ETHANOL IN HYDRATION MEDIA OF YEAST-LEAVENED DOUGH

| Example No. | % Ethanol | % Water | Hydration Media % Flour Basis |
|---|---|---|---|
| B* | 0 | 100 | 68.4 |
| 3 | 5 | 95 | 68.4 |

*Control; not an example of this invention.

Mixing of all dough ingredients is accomplished in a usual manner. Fermentation of the bulk dough is for 15 minutes at 27.0° C. Thereafter, the dough is divided, rounded and formed into 100 g portions with rest steps of between 5 and 15 minutes after handling. After forming, the dough is allowed to ferment for approximately 45 minutes until each 100 g dough portion attains a specific volume greater than 1.76 cc/g. The dough is then packaged and frozen as described in Example 1. The frozen, packaged dough of this example is stored at −15.0° C.

Each frozen dough portion is taken from the freezer and immediately placed in a cold oven (a standard size Kenmore electric wall oven) which is immediately turned on and allowed to heat to a temperature of about 175° C.

The results obtained for each 100-gram baked loaf are as follows:

| Loaf for Example No. | B | 3 |
|---|---|---|
| Volume of Frozen Dough (cc) | 220 | 220 |
| Volume of Baked Loaf (cc) | 290 | 370 |
| Oven Spring (cc) | 70 | 150 |

Ethanol in the hydration medium of Example 3 causes more than a two-fold increase in oven spring when compared to B, which does not contain ethanol.

The loaf for Example 3 has a good appearance, fresh-baked aroma of yeast-leavened bread, good flavor and texture.

The above description is for the purpose of teaching the person skilled in the art how to practice the present invention. This description is not intended to detail all of the obvious modifications and variations of the invention, .e.g, various leavening agents, use of preservatives, quantity of dough prepared, etc., which will become apparent to the skilled worker upon reading. However, applicant does intend to include all such obvious modifications and variations within the scope of his invention which are defined by the following claims.

What is claimed is:

1. A method of producing a frozen, leavened bread dough which is suitable for immediate baking when taken from the freezer comprising the steps of mixing bread forming ingredients including a leavening agent, fermenting said ingredients to produce a dough product, forming and resting the same, homogenously mixing in the dough, prior to forming and resting, an exogenous quantity of a water-soluble, melting-point depressant selected from a group consisting of $C_1$–$C_3$ monohydric alcohols, $C_2$ to $C_4$ polyhydric alcohols or combinations thereof such that the final concentration of melting-point depressant in the dough is from about 5% up to about 20% with respect to the weight of water contained in the dough freezing said dough product, whereby said melting-point depressant allows said frozen dough product to when placed in an oven quickly soften as oven temperature rises.

2. The method of claim 1 wherein a exogenous portion of the melting-point depressant is propylene glycol, glycerol, ethanol or mixtures thereof.

3. The method of claim 2 wherein the melting point depressant is ethanol.

4. The method of claim 1 wherein the leavening agent is a mixture of chemical compounds which react with an acid material to produce carbon dioxide.

5. The method of claim 4 wherein the chemical leavening agent is a mixture of gluconolactone and sodium bicarbonate.

6. The method of claim 1 wherein the bread dough is leavened by means of a yeast.

7. The method of claim 1 wherein a natural, cell-free prefermentation yeast broth is added to the dough before freezing to provide the exogenous portion of the melting-point depressant.

8. The method of claim 1 wherein a whole-yeast prefermentation broth is added to the dough before freezing to provide the exogenous portion of the melting-point depressant.

9. A product produced by the method of claim 1 wherein the exogenous portion of the melting-point depressant is ethanol obtained from a whole-yeast prefermentation broth.

10. A frozen bread dough composition which is hard as it exits the freezer, comprising flour, a leavening agent, about 30% to about 80% water based on the amount of flour and from about 5% to about 20%, with respect to the weight of water contained in the dough, of a water-soluble, melting-point depressant which functions to soften the dough and overcome thaw lag when baking the dough from the frozen state, produced by the method of claim 1.

11. The frozen bread dough composition of claim 10 wherein a portion of the melting-point depressant is exogenous propylene glycol, glycerol, ethanol or mixtures thereof.

12. The frozen bread dough composition of claim 11 wherein the melting point depressant is ethanol.

13. The frozen bread dough composition of claims 10, 11 or 12 wherein the leavening agent is a mixture of chemical compounds which react with an acid material to produce carbon dioxide.

14. The frozen bread dough composition of claim 10, 11 or 12 wherein the chemical leavening agent is a mixture of gluconolactone and sodium bicarbonate.

15. The frozen bread dough composition of claim 10 wherein the leavening agent is a yeast.

* * * * *